United States Patent
Burch, Sr.

[11] Patent Number: 6,129,399
[45] Date of Patent: Oct. 10, 2000

[54] GAME ANIMAL DRAGGING SYSTEM

[76] Inventor: Ricky J. Burch, Sr., 48539 Woodhaver Rd., Tickfaw, La. 70466

[21] Appl. No.: 09/357,630
[22] Filed: Jul. 20, 1999
[51] Int. Cl.$^7$ ............................. A01M 31/00; B65G 7/12
[52] U.S. Cl. ......................... 294/153; 294/150; 294/165
[58] Field of Search .................................. 294/15, 26, 74, 294/137, 141, 149–157, 165; 119/792, 801, 802, 805; 224/103, 184, 921; 280/19

[56] References Cited

U.S. PATENT DOCUMENTS

| | | | |
|---|---|---|---|
| 2,931,629 | 4/1960 | Keller | 294/149 X |
| 4,243,164 | 1/1981 | Burlison et al. | 294/15 X |
| 4,335,891 | 6/1982 | Alley et al. | 280/19 |
| 4,431,121 | 2/1984 | Bensette | 224/153 |
| 4,529,240 | 7/1985 | Engel | 294/150 X |
| 4,887,823 | 12/1989 | Hallett et al. | 280/19 |
| 4,982,885 | 1/1991 | Severson et al. | 294/157 X |
| 5,351,365 | 10/1994 | Hauck | 294/26 X |
| 5,382,064 | 1/1995 | Blais | 294/15 |
| 5,732,660 | 3/1998 | David et al. | 119/792 |
| 5,848,816 | 12/1998 | Hancock | 294/15 |
| 5,901,999 | 5/1999 | Brock | 294/150 X |
| 5,951,080 | 9/1999 | Wessner | 294/150 X |

Primary Examiner—Johnny D. Cherry
Attorney, Agent, or Firm—Henderson & Sturm LLP

[57] ABSTRACT

A game animal dragging system for dragging bucks, does, and other game animals from a kill site back to the camp site or vehicle. The system includes straps, each including a fixed loop to engage the antlers or neck of a game animal and a handle at the other end. One of the straps is provided with a slidable second strap that slides along the length thereof so that a second loop can be provided around the snout of the animal.

3 Claims, 1 Drawing Sheet

GAME ANIMAL DRAGGING SYSTEM

BACKGROUND OF THE INVENTION

1. Field of the Invention

The present invention relates to the field of hunting accessories, and more particularly to a game animal dragging system.

2. Description of Related Art

As can be seen by reference to the following U.S. Pat. Nos. 4,243,164; 4,335,891; 4,431,121; 4,887,823; 5,382,064; and 5,848,816, the prior art is replete with myriad and diverse game dragging devices.

While all of the aforementioned prior art constructions are more than adequate for the basic purpose and function for which they have been specifically designed, they are uniformly deficient with respect to their failure to provide a simple, efficient, and practical game animal dragging system.

As a consequence of the foregoing situation, there has existed a longstanding need for a new and improved type of game animal dragging system, and the provision of such a construction is a stated objective of the present invention.

BRIEF SUMMARY OF THE INVENTION

Briefly stated, the present invention provides a game animal dragging system for dragging bucks, does, and other game animals from a kill site back to the camp site or vehicle. The system includes straps, each including a fixed loop to engage the antlers or neck of a game animal and a handle at the other end. One of the straps is provided with a slidable second strap that slides along the length thereof so that a second loop can be provided around the snout of the animal.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
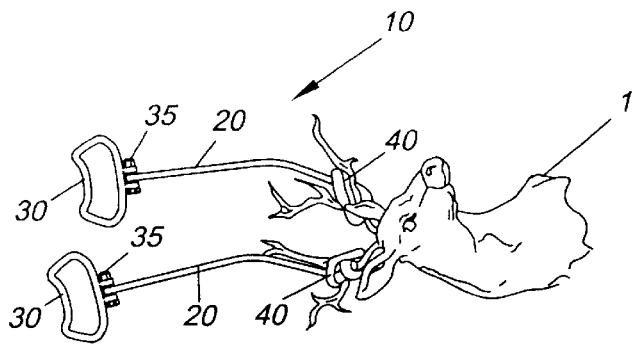
FIG. 1 is a perspective view of the game animal dragging device of the present invention secured to the antlers of a buck.
Figure 2:
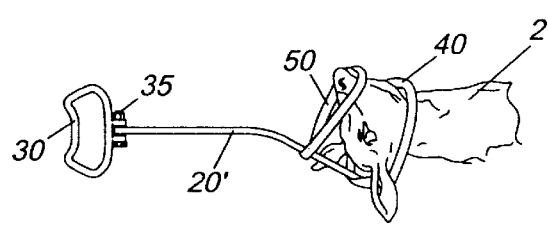
FIG. 2 is a perspective view of an alternate embodiment of the dragging device secured to the neck and snout of a doe.
Figure 3:
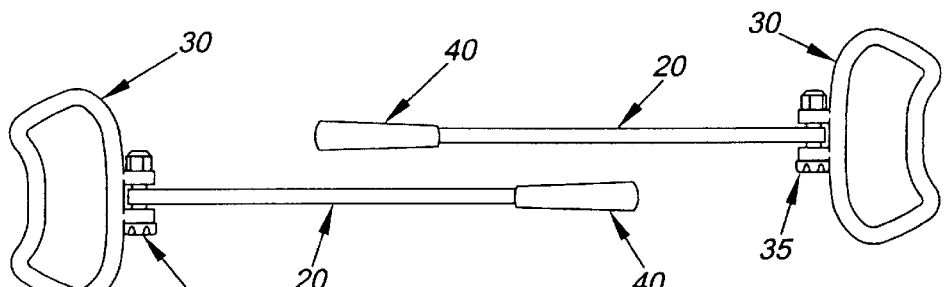
FIG. 3 is a perspective view of the pair of dragging devices used to drag a buck.
Figure 4:
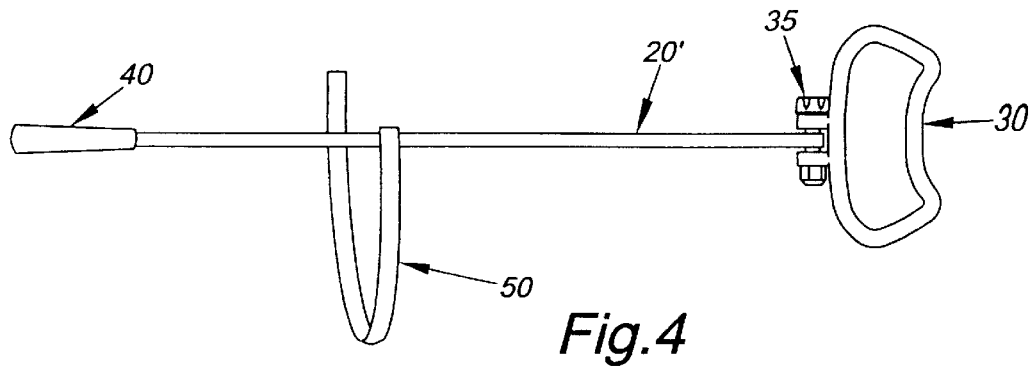
FIG. 4 is a perspective view of the dragging device used to drag a doe.

As can be seen by reference to the drawings, and in particular to FIG. 1, the game animal dragging system that forms the basis of the present invention is designated generally by the reference number 10. The dragging system 10 consists of three nylon straps 20, 20' each with an attached plastic handle 30 and an incorporated loop 40 at its opposite end. The straps 20, 20' are used to drag a buck 1, doe 2, or other animal that has been killed allowing the user to easily pull the animal through the woods or hunting area. Two straps 20 are used to drag a buck 1, with each strap 20 being placed on the deer's antlers. The third, longer strap 20' would be used to drag a doe 2, with a slidably attached second strap 50 being used to secure the animal's snout.

The dragging system 10 allows a hunter to easily drag or pull a deer through the woods or any similar environment. This method of transporting the deer would be much more comfortable for the user than carrying the animal on the back or shoulders.

The devices could be manufactured with colored handles 30 to make locating the devices easier if they are dropped in the woods, or with an incorporated hook that would allow the devices to be connected to any standard type four wheeler or ATV. The dragging system 10 could also be manufactured in a larger version designed for use with substantially larger game.

The dragging system consists of three nylon straps 20, 20', each with an attached plastic handle 30 and an incorporated loop 40 at its opposite end. The handles 30 are secured to the straps 20, 20' with plastic bolts or screws 35. One of the straps 20' is longer than the others, and this strap 20' has a smaller, attached nylonNelcro strap or band 50 that can be moved up or down the length of the larger strap 20'.

In use, the user would simply attach the dragging system 10 to a deer and drag or pull the animal through the woods or hunting area, back to a waiting vehicle or lodgings. For bucks 1, each of two loops 40 are secured to the animal's antlers by positioning the loop 40 at the end of the strap 20 around the anglers, inserting the handle 30 through the loop 40, and pulling the strap 20 tight around the antlers. For does, the loop 40 is wrapped around the animal's neck with the handle 30 being inserted through the loop 40 at the end of the strap 20' and pulled tight. The smaller loop 50 is then wrapped around the animal's snout and secured with loop and hook fasteners. If desired, the two straps 20 could then be attached to the handle 30 of the larger strap 20' to allow two people to drag the animal at once. The dragging system 10 makes transporting a deer or other animal much easier for a hunter, eliminating the necessity to carry the animal on his or her back and shoulders.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A game animal dragging system, comprising:
    a pair of identical dragging devices, each dragging device including a rigid hand ring having a continuous closed peripheral frame including a central hand receiving opening, a strap bracket attached to and extending out from the ring, an elongated flexible strap having a first end attached to the bracket and a second end formed into a first closed loop sized to allow the rigid hand ring to be passed therethrough, the first closed loop being attachable to a game animal's antler or neck; and a second flexible strap having one end slidably attached to the elongated flexible strap, and having another end selectively attachable to a portion of the second strap to form a second closed loop, the second closed loop being attachable to a game animal's snout.

2. The game animal dragging system of claim 1 wherein the elongated flexible strap is attached to the strap bracket with a nut and bolt fastener.

3. A method of dragging a game animal using the dragging system of claim 1, the method comprising the steps of:

positioning the first closed loop of one of the pair of dragging devices around the neck of the game animal, inserting the hand ring through the first closed loop, pulling the hand ring to tighten the elongated flexible strap around the neck of the game animal, positioning the second closed loop around the snout of the game animal; and pulling on the hand ring of the pulling device to drag the game animal over a ground surface.

* * * * *